UNITED STATES PATENT OFFICE.

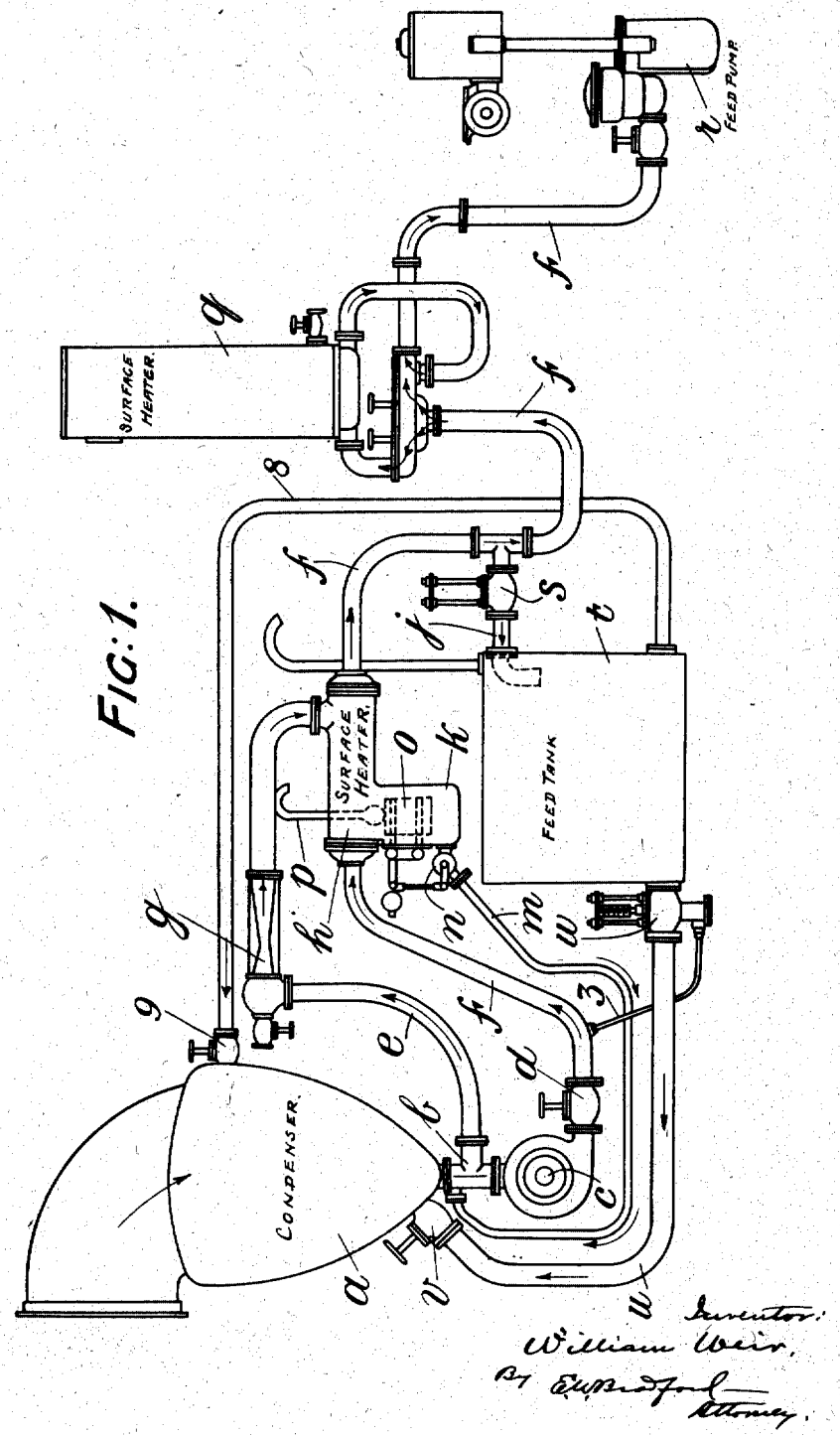

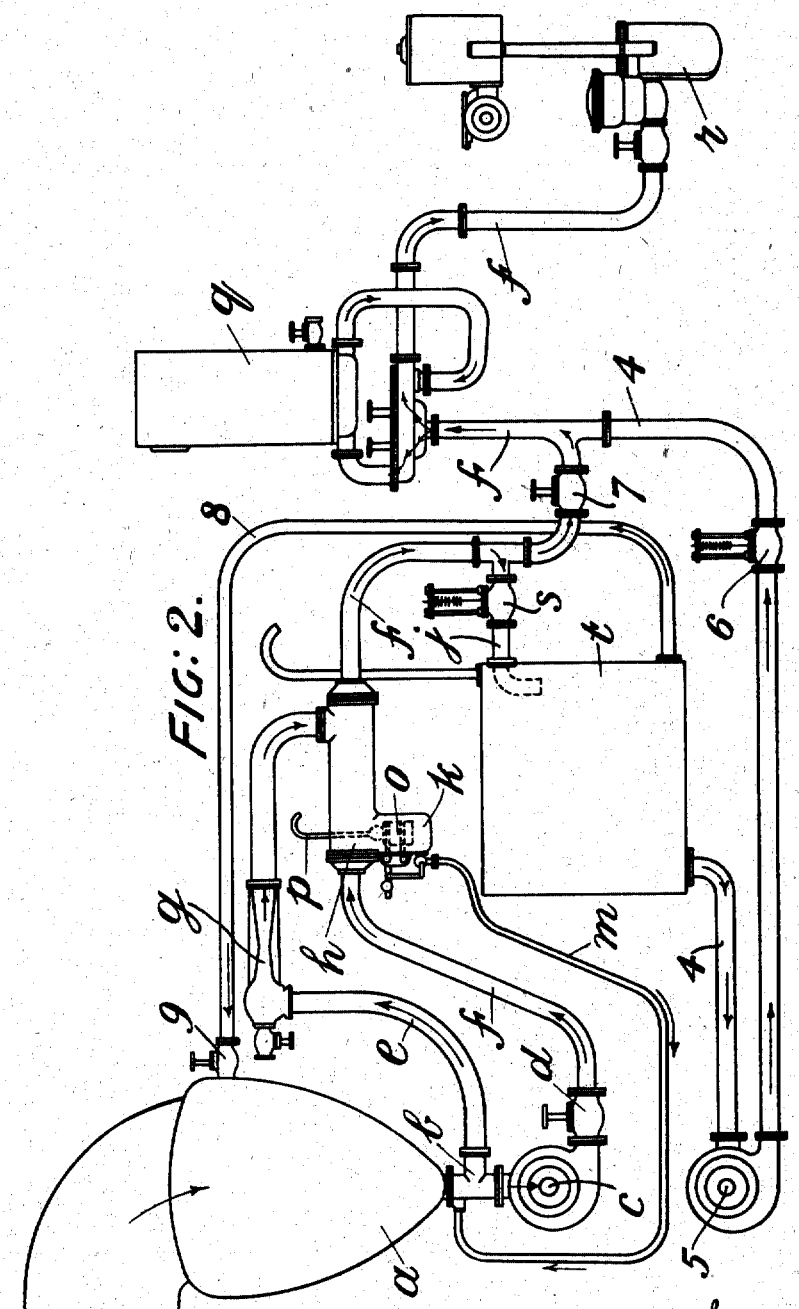

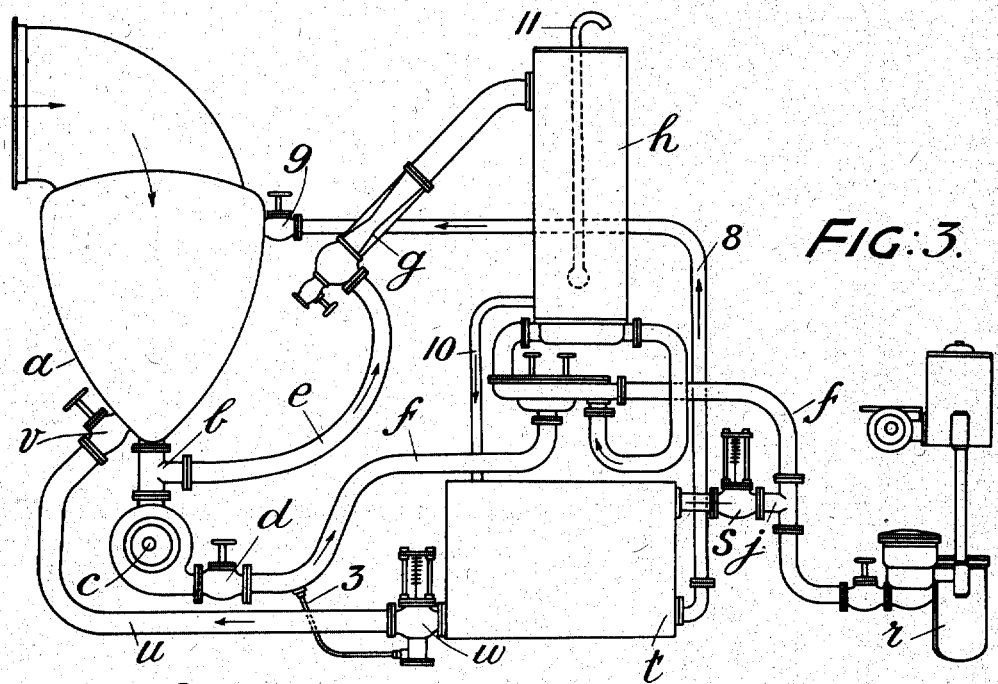
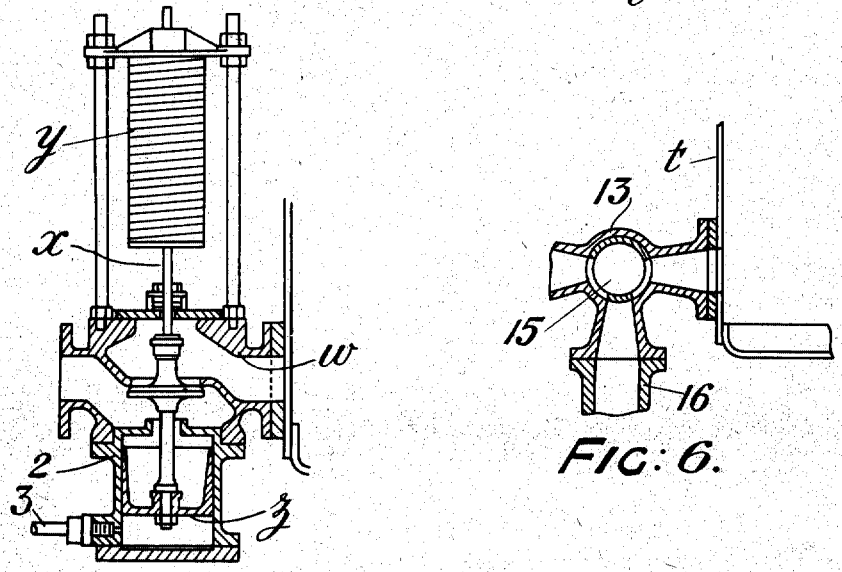

WILLIAM WEIR, OF GLASGOW, SCOTLAND, ASSIGNOR TO G. & J. WEIR, LIMITED, OF GLASGOW, SCOTLAND.

FEED-WATER-TREATMENT ARRANGEMENT IN STEAMSHIPS.

1,302,256.

Specification of Letters Patent.

Patented Apr. 29, 1919.

Application filed April 27, 1917. Serial No. 164,973.

*To all whom it may concern:*

Be it known that I, WILLIAM WEIR, a subject of the King of Great Britain and Ireland, residing at Holm Foundry, Cathcart, Glasgow, Scotland, have invented certain new and useful Improvements in Feed-Water-Treatment Arrangements in Steamships; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the treatment of feed water in systems for condensing steam and heating feed water in steamships.

The invention consists in a novel arrangement and combination of machinery and apparatus which will be described in the following specification and particularly defined in the annexed claims.

Referring to the accompanying drawings:—

Figure 1 is a diagrammatic representation of a feed water system according to the invention.

Fig. 2 is a similar view representing a modified arrangement.

Fig. 3 is a similar view representing another modified arrangement.

Fig. 5 is a vertical section of an automatically controlled valve employed in the arrangements represented by Figs. 1, 3, and 4.

Fig. 6 is a cross section through a cock employed in the arrangement represented in Fig. 4.

Figure 4:
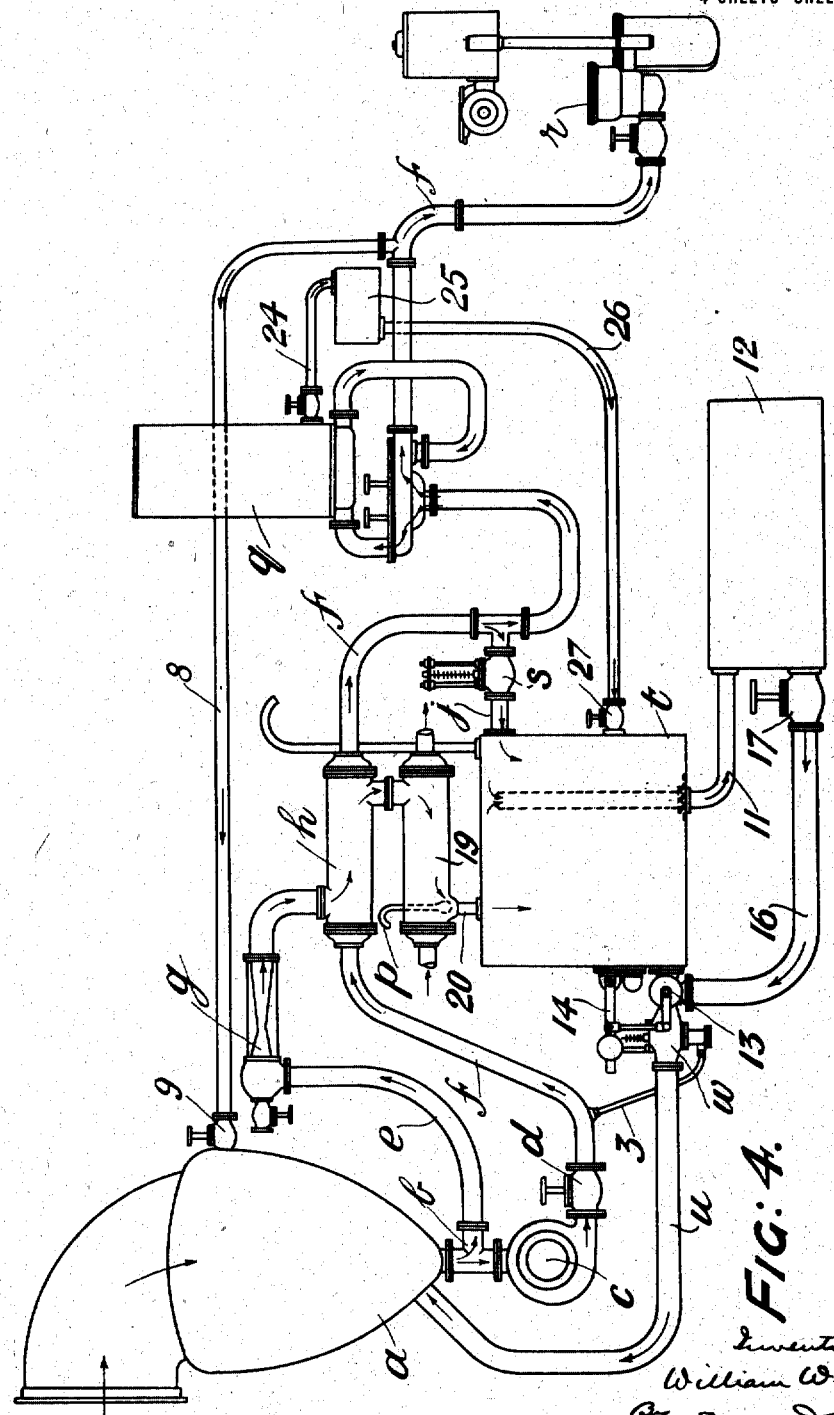
Fig. 4 is a similar view representing a further modification.

Referring in the first place to Fig. 1. $a$ is the main condenser from the bottom of which a pipe $b$ leads to the suction of a pump $c$ which will be referred to as the water-extraction pump and which is preferably of the centrifugal type. This pump delivers the water through a non-return valve $d$ into the main feed pipe $f$ at a pressure suitable for meeting the particular conditions of the installation; this pressure may generally with advantage be between five pounds and twenty-five pounds per square inch above atmosphere.

From the pipe $b$—or, if preferred, from the bottom of the condenser—a pipe $e$ (which is preferably given an upward turn) is led to a steam-jet air ejector $g$ which is arranged to draw air and vapor from the condenser and deliver it to a surface feed heater $h$ arranged on the main feed pipe $f$. The steam-jet steam, together with the water vapor brought from the condenser with the air, is condensed in this surface heater; and the heat abstracted is utilized to heat the feed water. The steam and air do not of course mix with the feed water from the pump $c$, being on opposite sides of the heating surface. The condensate drains into a well $k$ at the bottom of the heater; and a pipe $m$ connects this well with the suction of the water extraction pump—or, if preferred, with the main condenser. A valve or cock $n$ is provided to control the flow through this pipe and is itself controlled by a float $o$ in the well so as to open when the water in the well reaches a pre-determined level.

The air ejector is arranged to deliver the air and vapor into the heater at or above atmospheric pressure; and an air-discharge pipe $p$ is led from a suitable part of the steam space of the surface heater, or from the upper part of the well (i. e., above the water level) and permits of the discharge to the atmosphere of the air delivered by the air ejector.

The surface heater may be of any suitable surface type, that is, any suitable type in which the steam and water are kept separate, and the heat transferred through metal surfaces. A convenient design in the present scheme is one in which the water passes through tubes extending between two tube plates at opposite ends of a cylindrical vessel, the steam passing over the outside surfaces of the tubes.

A surface feed heater $q$ may be employed in addition to the heater $h$ and arranged on the main feed pipe in series with the heater $h$. In this secondary heater the feed water receives a further augmentation of temperature, the heating agent being generally exhaust steam from the auxiliary engines. Any usual or suitable valve and by-pass arrangement may be provided whereby the feed water can—when desired—be by-passed instead of made to flow through this heater. The heater, it is to be noted, is on the suction side of the feed pump $r$ (or feed pumps).

The condensed steam water from a single condenser may be delivered through a single primary feed heater $h$ to the boilers in several stokeholds, each stokehold being provided with an independent feed pump or feed pumps. In such a case all the water may pass through a single secondary feed heater $q$ and then be divided to supply the several stokeholds; or a separate secondary feed heater may be placed in each stokehold, and the water, after delivery from the primary feed heater, be divided and delivered through the several secondary feed heaters to the several feed pumps.

When the feed pump or feed pumps are not required to deliver water into the boilers and are consequently not running, or are not drawing a quantity of water equal in amount to that discharged from the condenser, provision is made for discharging the water which has been delivered by the water-extraction pump through the primary feed heater, or the excess of this water which is not required by the feed pumps, into a feed tank $t$ (under atmospheric pressure, as is usual). For this purpose a branch pipe $j$ is provided, leading from the main feed pipe, on the discharge side of the primary feed heater, to the feed tank; an automatic valve $s$ of the spring-loaded non-return type being provided on this branch, which valve is adapted to open with a sufficient difference of pressure and allow water to pass in a direction toward, but not in a direction away from, the feed tank. When, therefore, due to the stoppage or reduced working of the feed pumps, the pressure rises in the main feed pipe, this spring-loaded valve opens and allows the water, or the excess water, as the case may be, to pass into the feed tank.

A pipe $u$ is provided connecting the feed tank with the main condenser—or, if preferred, with the suction of the water-extraction pump. On this pipe two valves are provided—one, $v$, a hand-operated valve, and the other, $w$, an automatic valve which is shown in section—drawn to an enlarged scale—in Fig. 5. The spindle $x$ of this latter valve is connected to a spring $y$ and to a piston $z$ which latter works in a cylinder 2 which communicates by a pipe 3 with the main feed pipe between the pump $c$ and the feed heater $h$ (as shown in Fig. 1). By this arrangement it results that, when the water-extraction pump is receiving water of condensation from the main condenser in amount insufficient to meet the requirements of the boilers, the fall in pressure in the pipe $f$ will affect the piston so as to open the valve and consequently provide the water-extraction pump with sufficient water from the feed tank to make up the deficiency in its supply from the main condenser. It will be obvious that there can be no return flow, i. e., from main condenser to feed tank, through the valve $w$. If desired a diaphragm may be substituted for the piston $z$.

Referring now to Fig. 2, the arrangement shown therein differs from that represented in Fig. 1 only as regards the means for discharging feed water from the feed tank into the feed circulating system. The pipe $u$ is dispensed with, and in its place a pipe 4 is provided leading from the feed tank to the main feed pipe and joining the latter between its connection with the branch $j$ and the secondary surface feed heater $q$. A pump 5, preferably of the centrifugal type, is provided on the pipe 4 to discharge water through this pipe from the feed tank to the main feed pipe; and an automatic valve 6 of the loaded non-return type is placed on the pipe and on the discharge side of the pump. With this arrangement, when the pressure in the main feed pipe falls below a predetermined maximum, the valve 6 opens and allows of the delivery of water from the feed tank to the main feed pipe. When, however, there is sufficiency of water coming from the main condenser, and the pressure in the main feed pipe is normal, the pressure of discharge from the pump 5 is insufficient to deliver water past the valve 6 into the main feed pipe. A hand-operated shut-down valve 7 is provided on the main feed pipe between the pipe connections $j$ and 4.

Under normal conditions of working, the water delivered by the water-extracting pump is sufficient to condense the jet steam of the air ejector; but, under certain conditions if working—say during maneuvering—when a reduced quantity of exhaust steam is being delivered to the main condenser while the steam-jet steam is undiminished, or not proportionately reduced, it may be necessary to supplement the condensate drawn from the main condenser and pump through the primary feed heater. For this purpose a pipe 8, furnished with a hand-operated valve 9, is provided connecting the feed tank directly with the main condenser. Such a pipe connection is required with all alternative arrangements according to this invention and is shown in Figs. 1, 2, 3, and 4. By means of this pipe additional circulating feed water is obtained by opening the valve 9 when a flow of water takes place from the feed tank into the main condenser; and the water-extraction pump is thus able to draw sufficient water from the latter to condense the steam in the primary surface feed heater.

Moreover, by means of this pipe 8, a sufficient circulation may be maintained through the primary surface feed heater by the water-extraction pump even when no steam is being condensed in the main condenser and the steam jet of the air ejector is nevertheless in action. Should the feed pump not be in action, the water is maintained in constant circulation through primary heater, feed tank, main condenser, and water-extraction pump; and the passage through the main condenser prevents the temperature of the water from rising objectionably high.

The scheme may be modified without departing from its main characteristics as set forth at the beginning of this specification by subjecting the feed water to single instead of double heating. Fig. 3 illustrates such an arrangement, a single surface feed heater $h$ being employed which receives the discharge from the air ejector $g$, the condensate draining into the feed tank by the pipe 10 while the air escapes through an air-discharge pipe 11.

With this modification the same provision is made for delivering excess water when required from the main feed pipe to the feed tank as was described with reference to Fig. 1, viz., a pipe $j$ and a loaded valve $s$. For drawing supplementary water from the feed tank for supplying the feed pumps the same provision is made as is shown in Fig. 1, i. e., a pipe $u$ is provided, furnished with a valve $w$ controlled as already explained. Moreover, the same provision is made for condensing the discharge from the air ejector when there is no condensate, or an insufficiency of condensate, from the main condenser, i. e., a pipe 8 with a hand-controlled valve 9.

Fig. 4 illustrates another modification of the arrangement shown in Fig. 1. The arrangement in Fig. 4 possesses still further advantages as regards the de-aeration of the feed water. In this arrangement, as in those already described, the water-extraction pump $c$ delivers the feed water through a non-return valve $d$ to a surface feed heater $h$. The feed water, after traversing this feed heater, is led to and passed through a secondary and main surface feed heater $q$—or several of such heaters arranged in parallel—and thence proceeds to the suction of the boiler feed pump or pumps $r$.

The ejector $g$, which draws the air and vapor from the main condenser, discharges into the heater $h$ which, as regards its steam space, is connected, as illustrated, with a condenser 19, the two elements $h$ and 19 forming a combination surface heater condenser. The circulating water for the condenser portion 19 of this combination apparatus is taken from the main circulating discharge or any other suitable source. The steam-jet steam, together with the water vapor brought from the condenser with the air, is condensed in the combination surface heater condenser and drains through a pipe 20 into the main feed tank $t$.

The secondary and main surface feed heater $q$ (or feed heaters) may be of any suitable surface type in which the steam and water are kept separate and the heat transferred through metal surfaces; the heater may be furnished with the usual by-pass valves and connections. The heating steam would be taken from the auxiliary exhaust or, at a suitable point, from the main turbine. The water obtained from the condensation of the heating steam is led by a pipe 24 to a gravitation filter 25 and thence through a pipe 26 and a stop valve 27 to the main feed tank $t$. The condensed steam water from a single main condenser may be delivered through a single surface feed heater $h$, to the boilers in several stokeholds, each stokehold being provided with an independent feed pump or feed pumps. In such a case all the water may pass through a single secondary surface feed heater (such as $q$) and then be divided to supply the separate stokeholds; or a separate secondary heater (such as $q$) may be placed in each stokehold, and the water, after delivery from the primary surface feed heater be divided and delivered through the several secondary feed heaters to their respective feed pumps.

The air ejector is arranged to discharge the air and vapor into the combination surface heater condenser at or above atmospheric pressure, so that the air can be discharged to the atmosphere through a discharge pipe $p$ arranged at a suitable place on the combination apparatus.

The main feed tank $t$, which receives the water of condensation from the combination surface heater condenser, has an overflow connection 11 to a reserve feed tank 12 placed at a lower level. A pipe connection $u$—provided with a valve $w$ and a cock 13—leads from the lower portion of the main feed tank to the lower portion of the main condenser. The valve $w$ is of the same nature as that illustrated in Fig. 5 and already described with reference to the arrangement shown in Fig. 1. It will therefore be clear that the suction effect of the condenser to withdraw the water from the main feed tank through the pipe $u$ is controlled by the spring $y$, and by the pressure in the main feed pipe acting on the piston $z$ (or diaphragm).

The cock 13 is shown in cross section in Fig. 6; it acts to prevent the withdrawal of feed water from the main feed tank below a predetermined low level. A float is provided in the tank (or in a vessel connected thereto) and arranged to actuate the cock 13 through mechanism 14 so that normally—as shown in Fig. 6—a clear discharge outlet passage is provided from the main feed tank through the plug 15 of the cock; but, on the fall of the water in the tank to the predetermined level, the plug of the cock is partially rotated so as to shut off the pipe $u$ from connection with the main tank and place this pipe in connection with a pipe 16 leading from the reserve feed tank 12 through a stop valve 17. If this stop valve is open, the reserve feed tank then discharges through the pipe 16, cock 13, valve $w$, and pipe $u$ into the condenser.

Under normal working arrangements the water-extraction pump draws the water of condensation from the main condenser and delivers it along the main feed pipe, through the tubes of the primary surface feed heater $h$, and thereafter through the secondary feed heater $q$ (or heaters) to the suction of the feed pump or pumps which deliver it to the boilers.

In the event of the feed supply being in excess of that required for the boilers, the pressure will rise in the main feed pipe and open the spring loaded valve $s$ on a branch $j$ as in Figs. 1, 2, and 3: feed water will then pass through this branch and valve into the main feed tank.

In the event of a deficiency in the supply of feed water delivered by the water-extraction pump, the pressure in the main feed pipe will fall and will be communicated by the pipe 3 to the lower side of the piston $z$ (or diaphragm) so as to open the valve $w$ and enable the feed supply to be kept up from the main feed tank.

A pipe connection 8 (with stop valve 9) is provided as in the arrangement shown in Fig. 1 and for the same purpose.

If the secondary surface heater $q$ is made of a size capable of utilizing the whole of the available auxiliary exhaust steam, and no auxiliary exhausts are led to the L. P. turbine, then the only portion of the feed water requiring to be filtered is the exhaust steam condensed in the secondary surface feed heater, as this is the only portion of the steam containing oil or grease. The filter 25 hereinbefore referred to provides for the filtration of this feed water prior to its admission to the feed tank.

It is to be noted with respect to all the arrangements that, in normal working, the feed water is circulated in a perfectly closed system: never at any time has it access to the atmosphere. The air is separated from the water of condensation either before leaving, or immediately after leaving, the main condenser, and the water thereafter (under normal conditions) is afforded no opportunity of taking up air.

In the arrangements illustrated in Figs. 1, 3, and 4, all feed water taken from the main feed tank is passed through the main condenser and therefore subjected to the de-aerating effect of the latter before being admitted to the main feed pipe. Moreover, in the last mentioned arrangement this procedure is also adopted with respect to feed water taken from the reserve feed tank.

Owing to the arrangements hereinbefore described, it is not necessary—as is often the case—to elevate the feed tank or tanks in order to provide a requisite head for the feed pumps; and the feed tank (or tanks) can consequently be placed very low in the ship—a point of considerable importance in warships.

It is to be noted that the secondary surface feed heater or heaters (when employed) is or are under only small pressure. It is usual in the employment of a surface feed heater on board ship to place this heater on the discharge side of the feed pump, as otherwise the high temperature to which the water is raised impairs the suction of the pump. When the feed heater is placed on the discharge side of the feed pump, it has of course to be made sufficiently strong to stand the high pressure to which it is subjected and which of course is always greater than the working pressure of the boilers. The water-extraction pump employed in the present scheme enables the feed pump to act satisfactorily even when receiving water at a high temperature; and the secondary surface feed heater is therefore placed on the suction side of the feed pump and is consequently not under boiler pressure. The present scheme therefore allows of a substantial reduction in the weight of this surface heater, a matter of great importance, especially in warships.

Having thus described my invention, what I claim as new and desire to secure by Letters Patent is:—

1. In a steamship, in combination, a main condenser, a boiler feed pump, a main feed pipe extending from the said condenser to the said boiler feed pump, a water-extraction pump for the withdrawal of the water of condensation, i. e., the feed water, from the said condenser, and the delivery of the same under pressure into the said feed pipe, a surface feed heater on the said main feed pipe, a steam-jet air ejector for the extraction of the air, with vapor, from the said condenser and the delivery of the same into the said surface heater, the said heater being arranged for the heating of the feed water by the condensation of the steam from the ejector, a feed tank, an admission pipe connection between the said main feed pipe and said feed tank, an automatic non-return loaded valve on said pipe connection, a discharge pipe connection from said feed tank, an automatic non-return valve on said last mentioned pipe connection, a return pipe connecting the said feed tank with the said condenser, and a hand-controlled valve on said return pipe.

2. In a steamship, in combination, a main condenser, a boiler feed pump, a main feed pipe extending from the said condenser to the said boiler feed pump, a water-extraction pump for the withdrawal of the water of condensation, i. e., the feed water, from the said condenser, and the delivery of the same under pressure into the said feed pipe, a surface feed heater on the said main feed pipe, the water side of said heater being under the pressure of discharge from the said water-extraction pump while the steam side is under a pressure not less than atmospheric, a steam-jet air ejector for the extraction of the air, with vapor, from the said condenser and the delivery of the same into the said surface heater, the said heater being arranged for the heating of the feed water by the condensation of the steam from the ejector, a feed tank, an admission pipe connection between the said main feed pipe and said feed tank, an automatic non-return loaded valve on said pipe connection, a discharge pipe connection from said feed tank, and an automatic non-return valve on said last-mentioned pipe connection.

3. In a steamship, in combination, a main condenser, a boiler feed pump, a main feed pipe extending from the said condenser to the said boiler feed pump, a water-extraction pump for the withdrawal of the water of condensation, i. e., the feed water, from the said condenser, and the delivery of the same under pressure into the said feed pipe, a primary surface feed heater on the said main feed pipe, a steam-jet air ejector for the extraction of the air, with vapor, from the said condenser and the delivery of the same into the said surface heater, the said heater being arranged for the heating of the feed water by the condensation of the steam from the ejector, a feed tank, an admission pipe connection between the said main feed pipe and said feed tank, an automatic non-return loaded valve on said pipe connection, a discharge pipe connection from said feed tank, an automatic non-return valve on said last mentioned pipe connection, a secondary surface feed heater on the said main feed pipe between the said primary heater and the said boiler feed pump, a return pipe connecting the said feed tank with the said condenser, and a hand controlled valve on said return pipe.

4. In a steamship, in combination, a main condenser, a boiler feed pump, a main feed pipe extending from the said condenser to the said boiler feed pump, a water-extraction pump for the withdrawal of the water of condensation, i. e., the feed water, from the said condenser, and the delivery of the same under pressure into the said feed pipe, a surface feed heater on the said main feed pipe, a feed tank, an admission pipe connection between the said main feed pipe and said feed tank, an automatic non-return loaded valve on said pipe connection, a discharge pipe connection from said feed tank, a non-return valve on said last mentioned pipe connection, and means whereby this valve is controlled by the pressure existing at the discharge of the said water-extraction pump.

5. In a steamship, in combination, a main condenser, a boiler feed pump, a main feed pipe extending from the said condenser to the said boiler feed pump, a water-extraction pump for the withdrawal of the water of condensation, i. e., the feed water, from the said condenser, and the delivery of the same under pressure into the said feed pipe, a surface feed heater on the said main feed pipe, a steam-jet air ejector for the extraction of the air, with vapor, from the said condenser and the delivery of the same into the said surface heater, the said heater being arranged for the heating of the feed water by the condensation of the steam from the ejector, means for returning this condensed steam to the suction of the said water-extraction pump, a feed tank, an admission pipe connection between the said main feed pipe and said feed tank, an automatic non-return loaded valve on this pipe connection, a discharge pipe connection from said feed tank, and an automatic non-return valve on said last-mentioned pipe connection.

6. In a steamship, in combination, a main condenser, a boiler feed pump, a main feed pipe extending from the said condenser to the said boiler feed pump, a water-extraction pump for the withdrawal of the water of condensation, i. e., the feed water, from the said condenser, and the delivery of the same under pressure into the said feed pipe, a primary surface feed heater on the said main feed pipe, a steam-jet air ejector for the extraction of the air, with vapor, from the said condenser and the delivery of the same into the said surface heater, the said heater being arranged for the heating of the feed water by the condensation of the steam from the ejector, a main feed tank, an admission pipe connection between the said main feed pipe and said feed tank, an automatic non-return loaded valve on said pipe connection, a reserve feed tank, a discharge pipe connection from said feed tank, an automatic non-return valve on said last mentioned pipe connection, a cock on the said last mentioned pipe connection, a discharge pipe connection from said reserve tank to said cock, means whereby the water level in the said main feed tank controls the discharge of water through the said cock from the said main feed tank and the said reserve tank, a secondary surface feed heater of which the heating agent is auxiliary exhaust steam, this heater being on the said main feed pipe between the said primary heater and the said boiler feed pump, a gravitation filter, and pipe connections between the said filter and the said secondary heater and the said main feed tank respectively whereby the condensate obtained from the heating steam of the said secondary heater can flow through the said filter into the said main feed tank.

7. In a steamship, in combination, a main condenser, a boiler feed pump, a main feed pipe extending from the said condenser to the said boiler feed pump, a water-extraction pump for the withdrawal of the water of condensation, i. e., the feed water, from the said condenser, and the delivery of the same under pressure into the said feed pipe, a surface feed heater on the said main feed pipe, a steam-jet air ejector for the extraction of the air, with vapor, from the said condenser and the delivery of the same into the said surface heater, the said heater being arranged for the heating of the feed water by the condensation of the steam from the ejector, a main feed tank, an admission pipe connection between the said main feed pipe and said feed tank, an automatic non-return loaded valve on said pipe connection, a reserve feed tank, a discharge pipe connection from said main feed tank, an automatic non-return valve on said last mentioned pipe connection, a cock on the said last mentioned pipe connection, a discharge pipe connection from said reserve tank to said cock, means whereby the water level in the said main feed tank controls the discharge of water through the said cock from the said main feed tank and the said reserve feed tank, a return pipe connecting the said feed tank with the said condenser, and a hand-controlled valve on said return pipe.

8. In a steamship, in combination, a main condenser, a boiler feed pump, a main feed pipe extending from the said condenser to the said boiler feed pump, a water-extraction pump for the withdrawal of the water of condensation, i. e., the feed water, from the said condenser, and the delivery of the same under pressure into the said feed pipe, a surface feed heater on the said main feed pipe, a main feed tank, an admission pipe connection between the said main feed pipe and said feed tank, an automatic non-return loaded valve on said pipe connection, a reserve feed tank, a discharge pipe connection from said main feed tank and said reserve tank, a non-return valve on said last mentioned pipe connection, means whereby this valve is controlled by the pressure existing at the discharge of the said water-extraction pump, a cock on the said last mentioned pipe connection, a discharge pipe connection from said reserve tank to said cock, and means whereby the water level in said main feed tank controls the discharge of water through the said cock from the said main feed tank and the said reserve feed tank.

I hereby sign my name to this specification.

WILLIAM WEIR.

Copies of this patent may be obtained for five cents each, by addressing the "Commissioner of Patents Washington, D. C."